United States Patent [19]
van den Bussche

[11] 3,974,519
[45] Aug. 10, 1976

[54] APPARATUS FOR REPRODUCING A PAL COLOR TELEVISION SIGNAL WHICH IS RECORDED ON A RECORD CARRIER AND DROP OUT COMPENSATION

[75] Inventor: Willem van den Bussche, Eindhoven, Netherlands

[73] Assignee: U.S. Philips Corporation, New York, N.Y.

[22] Filed: June 28, 1974

[21] Appl. No.: 484,280

[30] Foreign Application Priority Data
July 17, 1973 Netherlands.................... 7309910

[52] U.S. Cl................................. 358/8; 360/38; 178/6.6 DC
[51] Int. Cl.².......................................... H04N 5/76
[58] Field of Search............... 358/4, 8, 16; 360/10, 360/38; 178/6.6 DC, 6.6 FS

[56] References Cited
UNITED STATES PATENTS

| | | | |
|---|---|---|---|
| 3,564,123 | 2/1971 | Pezirtzoglov | 360/10 |
| 3,586,762 | 6/1971 | Hodge | 358/8 |
| 3,660,596 | 5/1972 | Numakura | 358/4 |
| 3,854,015 | 12/1974 | Janssen | 360/10 X |

FOREIGN PATENTS OR APPLICATIONS

| | | | |
|---|---|---|---|
| 7,216,298 | 6/1973 | Netherlands | 358/4 |

OTHER PUBLICATIONS

Stratton, "Reviewing Slow-Motion Disc Principles," Broadcast Engineering Feb. 1969, pp. 14–18.

Primary Examiner—Robert L. Griffin
Assistant Examiner—Aristotelis M. Psitos
Attorney, Agent, or Firm—Frank R. Trifari; Henry I. Steckler

[57] ABSTRACT

A circuit for reproducing recorded PAL TV signals features a pair of mixers that produce signals of opposing phases. Thus the same picture can be repetitively viewed without losing the PAL phase alternation. Drop out compensation can be added.

5 Claims, 2 Drawing Figures

APPARATUS FOR REPRODUCING A PAL COLOR TELEVISION SIGNAL WHICH IS RECORDED ON A RECORD CARRIER AND DROP OUT COMPENSATION

BACKGROUND OF THE INVENTION

The invention relates to an apparatus for reproducing a color television signal which is recorded on a record carrier, which signal includes a first carrier which is frequency modulated by the luminance information and a chrominance carrier which is modulated by the chrominance information in accordance with the PAL standard, and whose frequency is lying between zero and the lower first-order side band of the modulated first carrier which corresponds to the highest modulation frequency, which apparatus comprises a first chrominance circuit with a first mixing stage, to which mixing stage the modulated chrominance carrier which is read from the record carrier and a first mixing signal are applied, which first mixing signal has a frequency whose spacing relative to the standard chrominance carrier frequency equals the chrominance carrier frequency, and a first output terminal to which a first standard chrominance signal on the standard chrominance carrier frequency is applied and which is delivered by the output of the first mixing stage.

Such an apparatus is known from U.S. Pat. No. 3,803,347. The signal coding described in said application, where the chrominance information is transposed from the frequency band around the standard chrominance carrier frequency, which is occupied in the case of the standard color television signal, to a lower frequency, has the advantage that for recording a comparatively small bandwidth suffices without giving rise to impermissible quality restrictions. It will be obvious that said coding is essential when recording on magnetic tape via simple equipment, the available bandwidth then also being limited in view of the desired band limitation. Also in the case of other recording media, including disk-shaped optically readable media, such a bandwidth limiting code fills a need and may therefore be used with advantage.

With such record carriers it is generally possible to reproduce the video information which is recorded on the record carrier at a speed other than the recording speed. It is for example known to realize a stationary picture by repeatedly scanning a certain track portion on the record carrier, which track portion for example contains exactly one television picture. This is of special importance in said disk-shaped record carrier which employs optical reading, because in this case the scanning point may be displaced arbitrarily without any wear of the record carrier. If such a disk-shaped record carrier contains a spiral track on which one television picture is recorded per revolution, a stationary picture may be obtained in a simple manner, for example by moving the scanning point back by one track distance in a radial direction upon each revolution of the record carrier, so that the track portion just read is scanned again.

The above does not present any problems as regards the luminance information. However, this is not so in respect of the color in the case of reproduction in accordance with the PAL system. Since a complete picture comprises an odd number of lines, this means that when realizing a stationary picture in the manner described above, the phase alternation in the chrominance signal which is required at the transition from the last line of a certain picture to the first line of the same picture does not occur, resulting in an incorrect chrominance information. Thus, a stationary colour television picture suitable for reproduction in accordance with the PAL system cannot readily be realized in the said manner.

SUMMARY OF THE INVENTION

It is an object of the invention to provide an apparatus in which said problem is obviated in a simple manner. The invention is characterized in that a first switching device is provided, which is controlled by a programming device, which also controls the sequence of scanning of the color television signal frames recorded on the record carrier and by causing said frames to be scanned in a sequence which differs from that during recording enables a reproduction of the recorded picture information at a speed other than the recording speed, which first switching device can assume a first position, in which the signal at the first output terminal is applied to a first output circuit, and a second position in which the signal at a second output terminal of a second chrominance circuit is applied to said first output circuit, the second chrominance circuit including a second mixing stage to which the modulated chrominance carrier read from the record carrier and a second mixing signal are applied, which second mixing signal has a frequency which with respect to the frequency of the first mixing signal is mirrored relative to the standard chrominance carrier frequency, and which second mixing stage supplies a second standard chrominance signal on the standard chrominance carrier at its output, which signal is fed to the second output terminal.

The step according to the invention ensures that irrespective of the reproducing speed of the signal which is recorded on the record carrier the standard chrominance signal which becomes available at the first output circuit exhibits the line-sequential phase alternation in accordance with the PAL standard, so that no color deviations occur. In order to enable a correct standard color signal to be obtained in the case of a disk-shaped record carrier with tangentially extending tracks, in which an odd number of television pictures is recorded per full revolution, the invention is characterized in that the programming device changes the position of the first switching device upon each command for a transient-like radial displacement of the scanning device over an odd number of track distances.

It is to be noted that from the published U.S. Pat. No. 3,798,357 an apparatus is known for reproducing a color television signal which is recorded on a record carrier, in which also two standard color signals are produced of mutually opposite phase. Said patent application, however, relates to a recording system, in which of every two successive lines of a television picture only the first line is recorded. During reproduction said recorded line is reproduced twice, namely once directly and once delayed. To obtain the line-sequential phase alternation necessary for the PAL standard, the two standard chrominance signals which become available are then applied line-sequentially. Consequently, the problem for which said patent application provides a solution differs substantially from the problem for which the present invention provides a solution, which results in essential differences in the reproduction apparatus, especially as regards the switch and the operation thereof.

Through a simple extension the apparatus according to the invention may be rendered suitable to correctly compensate for signal drop-outs in the chrominance signal. A first embodiment of said extended apparatus is characterized in that the first switching device includes a first and a second switch, which are interlocked and which each have a first and a second input and an output, the first and the second input of the first switch receiving the first and second standard chrominance signal respectively and the first and second input of the second switch receiving the second and the first standard chrominance signal respectively, and the output of the first switch being connected to the first output circuit and the output of the second switch to a second output circuit, and that a second switching device is present having a first input, which is connected to the first output circuit, and a second input which is connected to the second output circuit, which second output circuit includes a first delay means ensuring that the signal applied to the second input of the second switching device is delayed by one line time relative to the signal applied to the first input, and the second switching device is controlled by a signal drop-out detector and in the absence of a signal drop-out establishes a connection between the first input of the second switching device and a chrominance output terminal, and during the occurrence of a signal drop-out establishes a connection between the second input of said second switching device and said chrominance output terminal.

A second embodiment is characterized in that the connection between the output of the first mixing stage and the first output terminal includes a third switch and the connection between the output of the second mixing stage and the second output terminal a fourth switch, which two switches are interlocked and are controlled by a (signal) drop-out detector and in the absence of a (signal) drop-out establish a connection between the output of the first and second mixing stage respectively and the first and second output terminal respectively and during the occurrence of a (signal) drop-out a connection between the output of a second and third delay means respectively and said first and second output terminal respectively, the two delay means having a delay of one line time, and the input of the second delay means being connected to the second output terminal and the input of the third delay means to the first output terminal. Said embodiment has the advantage that signal drop-outs of a duration longer than one line time can also be compensated for.

BRIEF DESCRIPTION OF THE DRAWINGS

The invention will be described with reference to the two FIGS. 1 and 2, which show two embodiments of the apparatus according to the invention.

DETAILED DESCRIPTION OF THE INVENTION

Figure 1:
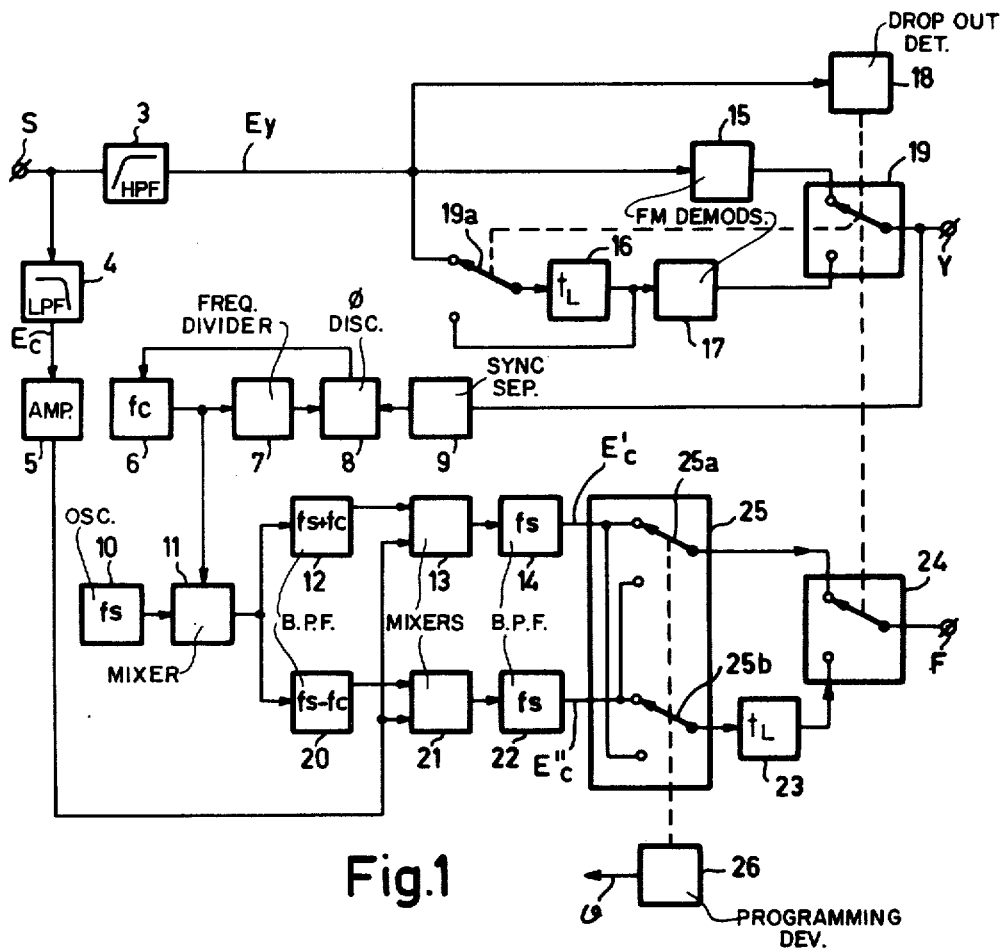

The first embodiment, shown in FIG. 1, comprises an input terminal S, to which the color television signal which is read from the record carrier is applied. From said color television signal at terminal S the luminance signal $E_y$ is extracted with the aid of a high-pass filter 3. Said luminance signal, which consists of a first carrier which is frequency-modulated with the luminance information, is demodulated with the aid of an FM demodulator 15 and the demodulated luminance signal becomes normally available at a terminal Y.

The chrominance signal $E_c$ on a chrominance carrier $f_c$ is extracted with the aid of a low-pass filter 4 and amplified with the aid of an amplifier 5. Said amplifier 5 may feature automatic gain control, which ensures that the chrominance signal at its output always has the correct amplitude. Said gain control may be effected in accordance with the amplitude of the color burst read from the record carrier or any other arbitrary pilot signal of stable amplitude.

For re-transposing the chrominance signal to the frequency band around the standard chrominance carrier frequency $f_s$ of 4.43 MHz in accordance with the European PAL system, the chrominance signal $E_c$ is fed to a mixing stage 13, to which also a mixing signal of a frequency equal to $f_s + f_c$, i.e., the sum of the chrominance carrier frequency $f_c$ and the standard chrominance carrier frequency $f_s$, is applied. From the mixing products supplied by said mixing stage 13 a first standard chrominance signal $E'_c$ on the standard chrominance carrier $f_s$ is extracted with the aid of a band-pass filter 14, which signal becomes available at the output terminal F. The luminance and chrominance signals which are available at the output terminals Y and F may be added, thus yielding the complete color television signal in accordance with the PAL standard.

The mixing signal of the frequency $f_s + f_c$ can be obtained by mixing in a mixing stage 11 a reference oscillator-signal of a frequency $f_s$ supplied by an oscillator 10 and an oscillator signal of a frequency $f_c$ supplied by an oscillator 6 and extracting the sum frequency $f_s + f_c$ thus obtained with the aid of band-pass filter 12. Said method of obtaining the mixing signal has the advantage that the influence of speed variations of the record carrier can be eliminated in a simple manner. The signal supplied by the oscillator 6 may be locked as regards its frequency to a pilot signal which is recorded on the record carrier. If the chrominance carrier frequency $f_c$ is locked to the line frequency, this may be effected in a very simple manner by dividing the oscillator signal with the aid of a frequency divider 7 so as to obtain a signal of line frequency and comparing the phase of said signal in a phase discriminator circuit 8 with a line synchronizing pulse train at the terminal Y which is derived from the luminance signal via a synchronizing pulse separator 9. Said phase discriminator circuit 8 then, in its turn, controls the oscillator 6, which takes the form of a voltage-controlled oscillator, whose output signal owing to said step is rigidly locked to said line synchronizing pulse train and which follows possible variations thereof. As the chrominance signal supplied to the mixing stage 13 by the amplifier 5 and the mixing signal supplied to said mixing stage 13 by the mixing stage 11 via the filter 12, owing this step, will have the same frequency variations as a result of speed variations, etc., said frequency variations are eliminated in the mixing product obtained at the output of the band-pass filter 14.

In such apparatus for reproducing a color television signal which is recorded on a record carrier, it is generally required to have the facility of reproducing the recorded picture information at a speed other than the recording speed. This is very well possible, though certainly not exclusively, when reading a disk-shaped record carrier, in which the picture information is recorded in optically coded form and which is read with the aid of an optical scanning system. Such a system, as described in U.S. Pat. No. 3,854,015 is particularly suited for reproducing the recorded picture information at a deviating speed, because the optical scanning spot can be moved over the record carrier in an arbitrary manner without any wear and, moreover, said movement may be performed very rapidly. If the disk-shaped record carrier is provided with a spiral track, it is favorable, as outlined in said last mentioned U.S. pat., if per revolution of the record carrier one complete picture is recorded. If a stationary picture is to be realized with this method of recording, it suffices to move the scanning spot radially backwards by one track distance upon every revolution of the record carrier, so that each time the same track portion is scanned. If said backward movement of the scanning spot is always performed during the vertical flyback period, the same picture will be scanned and reproduced continually. If no spiral but a concentric track is concerned, this automatically yields a stationary picture.

However, when considering the chrominance information during reproduction of such a stationary picture, it appears that this is not suited for reproduction in accordance with the PAL system. A complete television picture in said major European standard comprises 625 lines, which means that during the repeated scanning of the same picture the last line of one picture and the first line of the subsequently reproduced picture will have the same color phase and that the color burst of said lines will also have the same phase. This means that the phase alternation at line frequency which is required for PAL reproduction is discontinued.

In order to remedy this, the apparatus according to the invention includes a mixing stage 21, to which the chrominance signal $E_c$ is applied and a mixing signal of a frequency equal to $f_s - f_c$. With the aid of a band-pass filter 22 a second standard chrominance signal $E_c''$ around the standard chrominance carrier $f_s$ is extracted from the output signal of said mixing stage 21. The mixing signal of the frequency $f_s - f_c$ can be extracted from the output signal of the mixing stage 11 with the aid of a filter 20.

The two standard chrominance signals $E_c'$ and $E_c''$ thus obtained are already in phase opposition, which will be demonstrated hereinafter. It is assumed that the chrominance signal $E_c$ which is recorded on the record carrier may be written as:

$$E_c = u \cos\omega_c t \pm v \sin\omega_c t \qquad (1)$$

where $u$ and $v$ are the two quadrature modulated chrominance components and $\omega_c$ the angular frequency corresponding to the chrominance carrier frequency $f_c$, and the plus sign for example corresponding to the odd and the minus sign to the even lines of the television picture. Consequently, said + and − signs represent the line-sequential phase alternation of the PAL color signal. If said chrominance signal $E_c$ is mixed with the mixing signal of the frequency $f_s + f_c$, this yields the following mixing product $$(u \cos\omega_c t \pm v \sin\omega_c t) \cos(\omega_s + \omega_c)t = \tfrac{1}{2}\{u \cos(\omega_s + 2\omega_c)t \pm v \sin(\omega_s + 2\omega_c)t + u \cos\omega_s t \mp v \sin\omega_s t\} \qquad (2)$$

where $\omega_s$ and $\omega_c$ are the angular frequencies corresponding to the frequencies $f_s$ and $f_c$. With the aid of the filter 14 the standard chrominance signal $$E_c' = \tfrac{1}{2}\{u \cos\omega_s t \mp v \sin\omega_s t\} \qquad (3)$$

is extracted, the minus sign applying to the odd lines and the plus sign to the even lines.

Mixing the chrominance signal $E_c$ with the mixing signal of frequencies $f_s - f_c$ in mixing stage 21 yields the following mixing product:

$$(u \cos\omega_c t \pm v \sin\omega_c t) \cos(\omega_s - \omega_c)t = \tfrac{1}{2}\{u \cos\omega_s t \pm v \sin\omega_s t + u \cos(\omega_s - 2\omega_c)t \mp \sin(\omega_s - 2\omega_c)t\} \qquad (4)$$

from which the standard color signal $$E_c'' = \tfrac{1}{2}\{u \cos\omega_s t \pm v \sin\omega_s t\} \qquad (5)$$

is extracted with the aid of filter 22, the plus sign applying to the odd lines and the minus sign to the even lines.

The two standard chrominance signals $E_c'$ and $E_c''$ consequently always have the opposite color phase. The invention employs this in order to maintain the line sequential phase alternation in the eventually reproduced color signal at any arbitrary reproduction speed.

For this, the apparatus according to the invention includes a switch 25a with two inputs, to which the two standard chrominance signals $E_c'$ and $E_c''$ are applied, and one output. The position of said switch 25a is dictated by a programming device 26, which also controls the scanning sequence of the frames which are recorded on the record carrier, which is schematically represented by the arrow O. For example, in the case of a disk-shaped record carrier which per revolution contains one complete picture in a spiral track, the programming device 26 will move the scanning device radially backwards by one track distance after each revolution, preferably during the vertical flyback, to re-scan the same picture, for obtaining a stationary picture. For an example of such a programming device reference is made to said U.S. Pat. No. 3,854,015. During said return movement the desired phase alternation of the chrominance signal would normally be absent, because the first line and the last line of the same picture have the same color phase. However, by supplying by means of the switch 25a the standard chrominance signal $E_c''$ instead of the standard chrominance signal $E_c'$ to the terminal F as the chrominance signal simultaneously with said movement of the scanning device, the required phase alternation is fully restored. Consequently, if there is a stationary picture for a prolonged time, the position of the switch 25a will change at picture frequency (25 Hz). In the case of a deviating reproduction speed both the movement of the scanning device and the switching process of the switch will deviate.

The embodiment of the device according to the invention shown in FIG. 1 also includes a compensation device for signal drop-outs, both for the luminance signal and for the chrominance signal. The signal drop-out compensation device for the luminance signal first of all comprises a switch 19, which is normally in the shown position and which then transfers the luminance signal supplied by the FM demodulator 15 to the terminal Y. Furthermore, said compensation device in known manner comprises a switch 19a, via which switch 19a normally the luminance signal $E_y$ is applied to a line delay means 16, after which the delayed signal is demodulated by an FM demodulator 17 and applied to a second input of the switch 19. When a signal drop-out detector 18, to which the luminance signal $E_y$ is applied, detects a dropout, the position of the switch 19 is changed so that the signal at its second input is applied to the terminal Y as the luminance signal. Simultaneously, the position of the switch 19a is changed, so that the delay line 16 is included in a closed loop, as a result of which the instantaneous signal remains available as luminance signal. Thus, signal drop-outs of a duration longer than one line time can also be compensated for.

In order to compensate also for signal drop-outs in the chrominance signal, a switch 24 is included which is operated by the signal drop-out detection device 18. Moreover, the switch 25a now forms part of a switching device 25, which also includes a second switch 25b, which is coupled to the switch 25a. These two switches are connected to the filters 14 and 22 with their inputs in such a way that the two chrominance signals $E'_c$ and $E''_c$ are always available at their outputs, i.e., when the chrominance signal $E'_c$ appears at the output of the switch 25a, the chrominance signal $E''_c$ appears at the output of the switch 25b and vice versa. The chrominance signal at the output of said switch 25b is fed to a delay means 23 which introduces a delay of one line time and whose output is connected to a second input of the switch 24, while the first input of said switch 24 is connected to the output of the switch 25a. The switching device 25 ensures that the chrominance signals applied to the two inputs of the switch 24 always have the same color phase, so that when the position of the switch 24 is changed upon the occurrence of a signal drop-out no undesired phase transient occurs in the chrominance signal which is available at the terminal F.

The shown embodiment of the (signal) drop-out compensator for the chrominance signal is only suited to compensate for signal drop-outs of a duration shorter than or equal to one line time. If drop-outs in the chrominance signal of a longer duration are to be compensated for as well, it may be considered to employ the same configuration as used in the processing of the luminance signal, i.e., a closed loop with a delay means 16 and a switch 19a operated by the drop-out detector 18 instead of the delay means 23. However, in order to obtain the desired phase alternation after a signal drop-out duration of one line time, a second delay means of the same configuration must be used, to which the signal appearing at the output of the switch 25a is applied. The outputs of the two delay means are then applied via an additional switch to the second input of the switch 24, while the first input of said switch 24 directly receives the output signal of the switch 25a.

Normally, the output signal of the switch 25a is thus fed directly to the terminal F via switch 24. At the beginning of a signal drop-out the switch 24 is changed over and the delayed output signal of the switch 25b is fed to the terminal F. After a duration corresponding to one line time after the beginning of the signal drop-out the additional switch is changed over, for example by a pulse from a clock generator which is started at the beginning of the signal drop-out, and consequently the delayed output signal of the switch 25a is applied to the terminal F. After each line period the change-over of the additional switch is repeated, so that a chrominance signal with a phase alternation at line frequency is maintained at the terminal F, also in the case of signal drop-outs of a duration longer than one line time.

Figure 2:
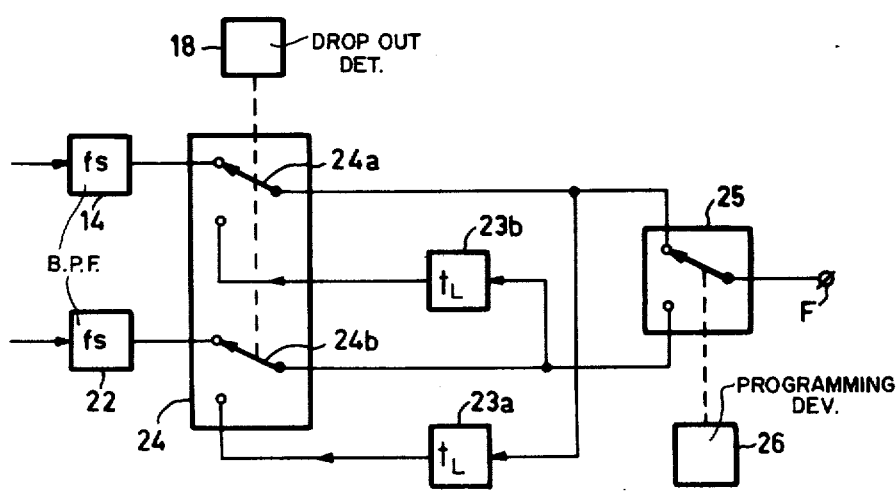

FIG. 2 shows a simple manner of realizing this. Here, the switch 24 which is operated by the (signal) drop-out detector 18, and 25 which is operated by the programming device 26, have been interchanged compared with the embodiment of FIG. 1. The switching device 24 is duplicated and includes two switches 24a and 24b, which are interlocked. In a first position these two switches feed the output signal of the filters 14 and 22 respectively directly to a first and second input respectively of the switch 25. The signals applied to said first and second input respectively of the switch 25, however, are also applied to a delay means 23a and 23b respectively, whose outputs are connected to a second input of the switch 24b and 24a respectively. Upon the occurrence of a signal drop-out the two switches 24a and 24b are set to the second position, so that a closed loop is obtained, which includes the series connection of the two delay means 23a and 23b. The signal which travels around in said closed loop consists of a sequence of the chrominance information of one and the same line, however with alternating phase, which signal via the switch 25 is supplied to the terminal F as a chrominance signal and which, when neglecting the losses, remains available indefinitely.

What is claimed is:

1. An apparatus for reproducing a color television signal which is recorded on a record medium and which comprises a first carrier, which is frequency-modulated by the luminance information, and a second carrier, which is modulated by the chrominance information in accordance with the PAL-standard and whose frequency lies between zero and the first-order lower side band of the modulated first carrier, said apparatus comprising a first chrominance circuit including a first mixing circuit, said first mixing circuit having first input means for receiving the modulated second carrier read from the record carrier and a second input means for receiving a first mixing signal which has a frequency which equals the sum of the standard PAL chrominance carrier frequency and the second carrier frequency, and a first output terminal means for providing a first standard PAL-chrominance signal;

a second chrominance circuit including a second mixing circuit, said second mixing circuit having first input means for receiving the modulated signal second carrier read from the record carrier and a second input means for receiving a second mixing signal which has a frequency which equals the difference between the standard PAL chrominance carrier frequency and the second carrier frequency, and a second output terminal means for providing a second standard PAL chrominance signal; a first output circuit;

a first switching device means for coupling in a first position the first output terminal to said first output circuit and for coupling in a second position the second output terminal to said first output circuit;

and a programming device coupled to said first switching device for altering the position of said first switching device at the transition of two successively read out color television signal frames having the same PAL-sequence, whereby the sequence of scanning of the recorded color television signal frames is changed.

2. An apparatus as claimed in claim 1, wherein said medium comprises a disk-shaped record medium with tangentially arranged tracks which are scanned by a scanning device and which contains an odd number of color television signal frames per full revolution, and wherein the programming device comprises means for providing a switching signal to the switching device for altering its position upon each commanded radial jump of the scanning device over an odd number of track distances.

3. An apparatus as claimed in claim 1, wherein the first switching device means includes a first and second switch, which are interlocked and which each have a first and a second input and an output, the first and the second input of the first switch receiving the first and second standard PAL chrominance signal respectively, the first and second input of the second switch receiving the second and first standard PAL chrominance signal respectively, the output of the first switch being coupled to the first output circuit, and further comprising a second output circuit coupled to the output of the second switch, a second switching device having a first input coupled to the first output circuit, and a second input coupled to the second output circuit, which second output circuit includes a first delay means for ensuring that the signal applied to the second input of the second switching device is delayed by one line time relative to the signal applied to the first input, and a drop-out detector means for controlling the second switching device which, in the absence of a signal drop-out establishes a connection between the first input of the second switching device and a chrominance output terminal, and upon the occurrence of a drop-out establishes a connection between the second input of said second switching device and said chrominance output terminal.

4. An apparatus as claimed in claim 1, further comprising a third switch coupled between the output of the first mixing stage and the first output terminal, a fourth switch coupled between the output of the second mixing stage and the second output terminal, which third and fourth switches are interlocked, second and third delay means, a drop-out detector means for controlling said third and fourth switches which in the absence of a drop-out establish a connection between the output of the first and second mixing stage respectively and the first and second output terminal respectively, and upon the occurrence of a signal drop-out establish a connection between the output of said second and third delay means respectively and said first and second output terminal respectively, the two delay means having a delay of one line time and the input of the second delay means being coupled to the second output terminal and the input of the third delay means being coupled to the first output terminal.

5. An apparatus as claimed in claim 1, further comprising means for generating a first reference-oscillator signal with a frequency equal to the standard PAL chrominance carrier frequency, means for generating a second oscillator signal of a frequency equal to the chrominance carrier frequency, means for mixing said first and second oscillator signals, means for extracting the two first-order mixing products which are symmetrically disposed relative to the standard PAL chrominance carrier frequency, and means for locking the frequency of the second oscillator signal to a pilot signal which is recorded on the record carrier.

* * * * *